US 11,487,827 B2

(12) United States Patent
Roitman

(10) Patent No.: US 11,487,827 B2
(45) Date of Patent: Nov. 1, 2022

(54) EXTENDED QUERY PERFORMANCE PREDICTION FRAMEWORK UTILIZING PASSAGE-LEVEL INFORMATION

(71) Applicant: International Business Machines Corporation, Armonk, NY (US)

(72) Inventor: Haggai Roitman, Yokneam Illit (IL)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 16/234,537

(22) Filed: Dec. 27, 2018

(65) Prior Publication Data
US 2020/0210489 A1 Jul. 2, 2020

(51) Int. Cl.
*G06F 7/00* (2006.01)
*G06F 16/93* (2019.01)
*G06F 16/903* (2019.01)

(52) U.S. Cl.
CPC ........ G06F 16/93 (2019.01); G06F 16/90335 (2019.01)

(58) Field of Classification Search
CPC ........ G06F 16/93; G06F 16/313; G06F 16/22; G06F 16/90335; G06F 40/10; G06F 40/211; G06Q 10/10
See application file for complete search history.

(56) References Cited

U.S. PATENT DOCUMENTS

| | | | |
|---|---|---|---|
| 2001/0000356 A1* | 4/2001 | Woods | G06F 16/93 |
| 2012/0030200 A1* | 2/2012 | Yu | G06F 16/951 |
| | | | 707/723 |
| 2016/0078102 A1* | 3/2016 | Crouch | G06F 16/313 |
| | | | 707/722 |
| 2017/0075893 A1 | 3/2017 | Hummel et al. | |

OTHER PUBLICATIONS

Evi Yulianti et al., Ranking Documents by Answer-Passage Quality, Proceedings of the 41st International ACM SIGIR Conference on Research & Development in Information Retrieval (SIGIR '18), Jul. 2018, p. 335-344, https://dl.acm.org/citation.cfm?id=3210028.

Mozhdeh Ariannezhad et al., Improving Retrieval Performance for Verbose Queries via Axiomatic Analysis of Term Discrimination Heuristic, Proceedings of the 40th International ACM SIGIR Conference on Research and Development in Information Retrieval (SIGIR'17), Aug. 2017, p. 1201-1204, https://dl.acm.org/citation.cfm?id=3080761.

(Continued)

*Primary Examiner* — Mohammad A Sana
(74) *Attorney, Agent, or Firm* — Daniel Morris; Otterstedt & Kammer PLLC

(57) ABSTRACT

An illustrative embodiment includes a method for post-retrieval query performance prediction using hybrid document-passage information. The method includes: obtaining a set of documents responsive to a specific query; extracting document-level information regarding respective documents within the set; extracting passage-level information regarding respective passages of documents within the set; and estimating a likelihood that the set of documents includes relevant information to the specific query using both the document-level information and the passage-level information.

20 Claims, 8 Drawing Sheets

| Corpus | Documents | Total Size | KB/doc | Topics | Conf | Track |
|---|---|---|---|---|---|---|
| AP | 242,918 | 728 MB | 3.07 | 100 | 51-150 | | Ad hoc |
| WSJ | 173,252 | 509 MB | 3.01 | 50 | 151-200 | | Ad hoc |
| TREC5 | 524,929 | 2057 MB | 4.01 | 50 | 251-300 | TREC5 | Ad hoc |
| ROBUST | 528,155 | 1904 MB | 3.69 | 250 | 301-450, 601-700 | TREC13 | Robust |
| WT10g | 1,692,096 | 10 GB | 6.20 | 100 | 451-550 | TREC10 | Web |
| GOV2 | 25,205,179 | 426 GB | 17.72 | 150 | 701-850 | TREC15 | Terabyte |

(56) References Cited

OTHER PUBLICATIONS

Xiaobing Xue et al., Improving Verbose Queries using Subset Distribution, Proceedings of the 19th ACM international conference on Information and knowledge management (CKIM '10), Oct. 2010, p. 1059-1068, https://dl.acm.org/citation.cfm?id=1871572.

Haggai Roitman, An Extended Query Performance Prediction Framework Utilizing Passage-Level Information, Proceedings of the 2018 ACM SIGIR International Conference on Theory of Information Retrieval (ICTIR '18), Sep. 2018, p. 35-42, https://dl.acm.org/citation.cfm?id=3234946.

Michael Bendersky et al., Modeling higher-order term dependencies in information retrieval using query hypergraphs, Proceedings of the 35th International ACM SIGIR Conference on Research and Development in Information Retrieval (SIGIR '12), Aug. 2012, p. 941-950, https://dl.acm.org/citation.cfm?id=2348408.

Michael Bendersky et al., Utilizing passage-based language models for document retrieval, Proceedings of the 30th European Conference on Advances in Information Retrieval (ECIR'08), Lecture Notes in Computer Science (LNCS) 4956, Mar.-Apr. 2008, p. 162-174, https://link.springer.com/chapter/10.1007/978-3-540-78646-7_17.

A. Bhattacharyya, On a measure of divergence between two multinomial populations, Sankhyā: The Indian Journal of Statistics, v. 7, n. 4, Jul. 1946, p. 401-406, https://www.jstor.org/stable/25047882.

James P. Callan, Passage-level evidence in document retrieval, Proceedings of the 17th Annual International ACM SIGIR Conference on Research and Development in Information Retrieval (SIGIR '94), Aug. 1994, p. 302-310, https://dl.acm.org/citation.cfm?id=188589.

David Carmel et al., Query performance prediction for IR, Proceedings of the 35th International ACM SIGIR Conference on Research and Development in Information Retrieval (SIGIR '12), Aug. 2012, p. 1196-1197, https://dl.acm.org/citation.cfm?id=2348540.

David Carmel et al., What makes a query difficult?, Proceedings of the 29th Annual International ACM SIGIR Conference on Research and Development in Information Retrieval (SIGIR '06), Aug. 2006, p. 390-397, https://dl.acm.org/citation.cfm?id=1148238.

Steve Cronen-Townsend et al., Predicting query performance, Proceedings of the 25th Annual International ACM SIGIR Conference on Research and Development in Information Retrieval (SIGIR '02), Aug. 2002, p. 299-306, https://dl.acm.org/citation.cfm?id=564429.

Steve Cronen-Townsend et al., Precision prediction based on ranked list coherence, Information Retrieval, vol. 9, No. 6, Dec. 2006, p. 723-755, https://link.springer.com/article/10.1007/s10791-006-9006-4.

Ronan Cummins, Document score distribution models for query performance inference and prediction, ACM Transactions on Information Systems (TOIS), v. 32, n. 1, Jan. 2014, p. 2:1-2:28, https://dl.acm.org/citation.cfm?id=2559170.

Guy Feigenblat et al., Unsupervised query-focused multi-document summarization using the cross entropy method, Proceedings of the 40th International ACM SIGIR Conference on Research and Development in Information Retrieval (SIGIR '17), Aug. 2017, p. 961-964, https://dl.acm.org/citation.cfm?id=3080690.

Mathias Géry et al., Bm25t: A bm25 extension for focused information retrieval, Knowledge and Information Systems, v. 32, n. 1, Jul. 2012, p. 217-241, https://link.springer.com/article/10.1007/s10115-011-0426-0.

Manish Gupta et al.. Information retrieval with verbose queries, Proceedings of the 38th International ACM SIGIR Conference on Research and Development in Information Retrieval (SIGIR '15), Aug. 2015, p. 1121-1124, https://dl.acm.org/citation.cfm?id=2767877.

Ido Guy, Searching by talking: Analysis of voice queries on mobile web search, Proceedings of the 39th International ACM SIGIR Conference on Research and Development in Information Retrieval (SIGIR '16), Jul. 2016, p. 35-44, https://dl.acm.org/citation.cfm?id=2911525.

Claudia Hauff et al., A survey of pre-retrieval query performance predictors, Proceedings of the 17th ACM Conference on Information and Knowledge Management (CIKM '08), Oct. 2008, p. 1419-1420, https://dl.acm.org/citation.cfm?id=1458311.

Shay Hummel et al., Clarity re-visited, Proceedings of the 35th international ACM SIGIR conference on Research and development in information retrieval (SIGIR '12), Aug. 2012, p. 1039-1040, https://dl.acm.org/citation.cfm?id=2348458.

Eyal Krikon et al., Predicting the performance of passage retrieval for question answering, Proceedings of the 21st ACM International Conference on Information and Knowledge Management (CIKM '12), Oct. 2012, p. 2451-2454, https://dl.acm.org/citation.cfm?id=2398664.

Oren Kurland et al., A unified framework for post-retrieval query-performance prediction, Proceedings of Proceedings of the Third international conference on Advances in information retrieval theory (ICTIR '11), Sep. 2012, p. 15-26, https://link.springer.com/chapter/10.1007%2F978-3-642-23318-0_4.

Oren Kurland et al., Back to the roots: A probabilistic framework for query-performance prediction, Proceedings of the 21st ACM international conference on Information and knowledge management (CIKM '12), Oct. 2012, p. 823-832, https://dl.acm.org/citation.cfm?id=2396866.

Victor Lavrenko et al., Relevance based language models, Proceedings of the 24th Annual International ACM SIGIR Conference on Research and Development in Information Retrieval (SIGIR '01), Sep. 2001, p. 120-127, https://dl.acm.org/citation.cfm?id=383972.

Xiaoyong Liu et al., Passage retrieval based on language models, Proceedings of the Eleventh International Conference on Information and Knowledge Management (CIKM '02), Nov. 2002, p. 375-382, https://dl.acm.org/citation.cfm?id=584854.

Jay M. Ponte et al,, A language modeling approach to information retrieval, Proceedings of the 21st Annual International ACM SIGIR Conference on Research and Development in Information Retrieval (SIGIR '98), Aug. 1998, p. 275-281, https://dl.acm.org/citation.cfm?id=291008.

Fiana Raiber et al.. On identifying representative relevant documents, Proceedings of the 19th ACM International Conference on Information and Knowledge Management (CIKM '10), Oct. 2010, p. 99-108, https://dl.acm.org/citation.cfm?id=1871454.

S. E. Robertson et al., Some simple effective approximations to the 2-poisson model for probabilistic weighted retrieval, Proceedings of the 17th annual international ACM SIGIR conference on Research and development in Information retrieval (SIGIR '94), Jul. 1994, p. 232-241, https://dl.acm.org/citation.cfm?id=188561.

Haggai Roitman, An enhanced approach to query performance prediction using reference lists. Proceedings of the 40th International ACM SIGIR Conference on Research and Development in Information Retrieval (SIGIR '17), Aug. 2017, p. 869-872, https://dl.acm.org/citation.cfm?id=3080665.

Haggai Roitman, Query performance prediction using passage-level information, Proceedings of 41st International ACM SIGIR Conference on Research & Development in Information Retrieval (SIGIR '18), Jun. 2018, p. 893-896, https://dl.acm.org/citation.cfm?id=3210070.

Haggai Roitman et al., Enhanced mean retrieval score estimation for query performance prediction, Proceedings of the ACM SIGIR International Conference on Theory of Information Retrieval (ICTIR '17), Oct. 2017, p. 35-42, https://dl.acm.org/citation.cfm?id=3121051.

Haggai Roitman et al., Robust standard deviation estimation for query performance prediction, Proceedings of the ACM SIGIR International Conference on Theory of Information Retrieval (ICTIR '17), Oct. 2017, p. 245-248, https://dl.acm.org/citation.cfm?id=3121087.

Anna Shtok et al., Query performance prediction using reference lists, ACM Transactions on Information Systems (TOIS), v. 34, n. 4, Sep. 2016, p. 19:1-19:34, https://dl.acm.org/citation.cfm?id=2926790.

(56) References Cited

OTHER PUBLICATIONS

Anna Shtok et al., Predicting query performance by query-drift estimation, ACM Transactions on Information Systems (TOIS): v. 30, n. 2, May 2012, p. 11:1-11:35, https://dl.acm.org/citation.cfm?id=2180873.

Stefanie Tellex et al., Quantitative evaluation of passage retrieval algorithms for question answering, Proceedings of the 26th Annual International ACM SIGIR Conference on Research and Development in Information Retrieval (SIGIR '03), Jul. 2003, p. 41-47, https://dl.acm.org/citation.cfm?id=860445.

Vishwa Vinay et al., On ranking the effectiveness of searches, Proceedings of the 29th Annual International ACM SIGIR Conference on Research and Development in Information Retrieval (SIGIR '06), Aug. 2006, p. 398-404, https://dl.acm.org/citation.cfm?id=1148239.

Elad Yom-Tov et al., Learning to estimate query difficulty: Including applications to missing content detection and distributed information retrieval, Proceedings of the 28th Annual International ACM SIGIR Conference on Research and Development in Information Retrieval (SIGIR '05), Aug. 2005, p. 512-519, https://dl.acm.org/citation.cfm?id=1076121.

Chengxiang Zhai et al., A study of smoothing methods for language models applied to ad hoc information retrieval, Proceedings of the 24th annual international ACM SIGIR conference on Research and development in information retrieval (SIGIR '01), Sep. 2001, p. 334-342, https://dl.acm.org/citation.cfm?id=384019.

Yun Zhou et al., Query performance prediction in web search environments, Proceedings of the 30th Annual International ACM SIGIR Conference on Research and Development in Information Retrieval (SIGIR '07), Jul. 2007, p. 543-550.

Ellen M. Voorhees et al., Overview of the Fifth Text REtrieval Conference (TREC-5), Proceedings of the Fifth Text Retrieval Conference, National Institute of Standards and Technology (NIST) Special Publication 500-238, Nov. 1997, p. 1-28, https://nvlpubs.nist.gov/nistpubs/Legacy/SP/nistspecialpublication500-238.pdf.

Ellen M. Voorhees et al., Overview of the Sixth Text REtrieval Conference (TREC-6), Proceedings of the Sixth Text Retrieval Conference, Aug. 1998, p. 1-24, National Institute of Standards and Technology (NIST) Special Publication 500-240, https://nvlpubs.nist.gov/nistpubs/Legacy/SP/nistspecialpublication500-240.pdf.

Ellen M. Voorhees et al., Overview of the Eighth Text REtrieval Conference (TREC-8), Proceedings of the Eighth Text Retrieval Conference, National Institute of Standards and Technology (NIST) Special Publication 500-246, Nov. 2000, p. 1-23, https://nvlpubs.nist.gov/nistpubs/Legacy/SP/nistspecialpublication500-246.pdf.

Ellen M. Voorhees et al.. Overview of TREC 2001, Proceedings of the Tenth Text Retrieval Conference, National Institute of Standards and Technology (NIST) Special Publication 500-250, May 2002, p. 1-15, https://nvlpubs.nist.gov/nistpubs/Legacy/SP/nistspecialpublication500-250.pdf.

David Hawking et al., Overview of the TREC-2001 Web Track, Proceedings of the Tenth Text Retrieval Conference, National Institute of Standards and Technology (NIST) Special Publication 500-250, May 2002, p. 61-67, https://nvlpubs.nist.gov/nistpubs/Legacy/SP/nistspecialpublication500-250.pdf.

Peter Bailey et al., Engineering a multi-purpose test collection for Web retrieval experiments, Information Processing and Management, v. 39, n. 6, Nov. 2003, p. 853-871, https://www.sciencedirect.com/science/article/abs/pii/S0306457302000845.

Ellen M. Voorhees, Overview of TREC 2004, Proceedings of the Thirteenth Text Retrieval Conference, National Institute of Standards and Technology (NIST) Special Publication 500-261, Aug. 2005, p. 1-15, https://nvlpubs.nist.gov/nistpubs/Legacy/SP/nistspecialpublication500-261.pdf.

Ellen M. Voorhees, Overview of the TREC 2004 Robust Retrieval Track, Proceedings of the Thirteenth Text Retrieval Conference, National Institute of Standards and Technology (NIST) Special Publication 500-261, Aug. 2005, p. 70-79, https://nvlpubs.nist.gov/nistpubs/Legacy/SP/nistspecialpublication500-261.pdf.

Ellen M. Voorhees, Overview of TREC 2006, Proceedings of the Fifteenth Text Retrieval Conference, National Institute of Standards and Technology (NIST) Special Publication 500-272, Oct. 2007, p. 1-16, https://nvlpubs.nist.gov/nistpubs/Legacy/SP/nistspecialpublication500-272.pdf.

Stefan Büttcher et al., Overview of the TREC 2006 Terabyte Track, Proceedings of the Fifteenth Text Retrieval Conference, National Institute of Standards and Technology (NIST) Special Publication 500-272, Oct. 2007, p. 128-141, https://nvlpubs.nist.gov/nistpubs/Legacy/SP/nistspecialpublication500-272.pdf.

Nick Craswell, GOV2 Test Collection, May 2004, 2 pages, http://ir.dcs.gla.ac.uk/test_collections/gov2-summary.htm.

Apache Software Foundation, Apache Lucene Core, Dec. 2018, 2 pages, https://lucene.apache.org/core/.

* cited by examiner

FIG. 1

| Corpus | Documents | Total Size | KB/doc | Topics | | Conf | Track |
|---|---|---|---|---|---|---|---|
| AP | 242,918 | 728 MB | 3.07 | 100 | 51-150 | | Ad hoc |
| WSJ | 173,252 | 509 MB | 3.01 | 50 | 151-200 | | Ad hoc |
| TREC5 | 524,929 | 2057 MB | 4.01 | 50 | 251-300 | TREC5 | Ad hoc |
| ROBUST | 528,155 | 1904 MB | 3.69 | 250 | 301-450, 601-700 | TREC13 | Robust |
| WT10g | 1,692,096 | 10 GB | 6.20 | 100 | 451-550 | TREC10 | Web |
| GOV2 | 25,205,179 | 426 GB | 17.72 | 150 | 701-850 | TREC15 | Terabyte |

FIG. 2A

| | Number of Docs | Total Words for all Docs | Mean Words per Doc | Median Words per Doc | Total Size (MB) | Size per Doc (KB) |
|---|---|---|---|---|---|---|
| Associated Press Newswire, 1989 | 84,678 | 40,128,904 | 473.9 | 446 | 254 | 3.07 |
| Associated Press Newswire, 1988 | 79,919 | 37,458,035 | 468.7 | 438 | 237 | 3.04 |
| Associated Press Newswire, 1990 | 78,321 | 37,468,766 | 478.4 | 451 | 237 | 3.10 |
| Total for AP corpus | 242,918 | 115,055,706 | 473.6 | | 728 | 3.07 |

FIG. 2B

| | Number of Docs | Total Words for all Docs | Mean Words per Doc | Median Words per Doc | Total Size (MB) | Size per Doc (KB) |
|---|---|---|---|---|---|---|
| Wall Street Journal, 1987-1989 | 98,732 | 42,849,688 | 434.0 | 245 | 267 | 2.77 |
| Wall Street Journal, 1990-1992 | 74,520 | 37,885,968 | 508.4 | 301 | 242 | 3.33 |
| Total values for WSJ corpus | 173,252 | 80,735,656 | 466.0 | | 509 | 3.01 |

FIG. 2C

|  | Number of Docs | Total Words for all Docs | Mean Words per Doc | Median Words per Doc | Total Size (MB) | Size per Doc (KB) |
|---|---|---|---|---|---|---|
| Wall Street Journal, 1990-1992 | 74,520 | 37,885,968 | 508.4 | 301 | 242 | 3.33 |
| Associated Press Newswire, 1988 | 79,919 | 37,458,035 | 468.7 | 438 | 237 | 3.04 |
| Computer Selects articles, Ziff-Davis | 56,920 | 25,722,148 | 451.9 | 182 | 175 | 3.15 |
| Federal Register, 1988 | 19,860 | 27,369,066 | 1378.1 | 396 | 209 | 10.78 |
| Financial Times, 1991-1994 | 210,158 | 86,732,207 | 412.7 | 316 | 564 | 2.75 |
| Federal Register, 1994 | 55,630 | 35,864,661 | 644.7 | 588 | 395 | 7.27 |
| Congressional Record, 1993 | 27,922 | 38,350,867 | 1373.5 | 288 | 235 | 8.62 |
| Total values for TREC5 corpus | 524,929 | 289,382,952 | 551.3 |  | 2057 | 4.01 |

FIG. 2D

|  | Number of Docs | Total Words for all Docs | Mean Words per Doc | Median Words per Doc | Total Size (MB) | Size per Doc (KB) |
|---|---|---|---|---|---|---|
| Financial Times, 1991-1994 | 210,158 | 86,732,207 | 412.7 | 316 | 564 | 2.75 |
| Federal Register, 1994 | 55,630 | 35,864,661 | 644.7 | 588 | 395 | 7.27 |
| Foreign Broadcast Information Service | 130,471 | 70,924,036 | 543.6 | 322 | 470 | 3.69 |
| Los Angeles Times, 1989-1990 | 131,896 | 69,443,244 | 526.5 | 351 | 475 | 3.69 |
| Total values for Robust corpus | 528,155 | 262,964,147 | 497.9 |  | 1904 | 3.69 |

FIG. 3A

| AP | Min | Max | Mean |
|---|---|---|---|
| 51-100 | 44 | 250 | 107.4 |
| Title | 1 | 11 | 3.8 |
| Description | 5 | 41 | 17.9 |
| Narrative | 23 | 209 | 64.5 |
| 101-150 | 54 | 231 | 130.8 |
| Title | 2 | 9 | 4.9 |
| Description | 6 | 41 | 18.7 |
| Narrative | 27 | 165 | 78.8 |

FIG. 3B

| WSJ | Min | Max | Mean |
|---|---|---|---|
| 151-200 | 49 | 180 | 103.4 |
| Title | 2 | 20 | 6.5 |
| Description | 9 | 42 | 22.3 |
| Narrative | 26 | 146 | 74.6 |

| TREC5 | Min | Max | Mean |
|---|---|---|---|
| 251-300 | 29 | 213 | 82.7 |
| Title | 2 | 10 | 3.8 |
| Description | 6 | 40 | 15.7 |
| Narrative | 19 | 168 | 63.2 |

| Robust | Min | Max | Mean |
|---|---|---|---|
| 301-350 | 47 | 156 | 88.4 |
| Title | 1 | 5 | 2.7 |
| Description | 5 | 62 | 20.4 |
| Narrative | 17 | 142 | 65.3 |
| 351-400 | 31 | 114 | 57.6 |
| Title | 1 | 3 | 2.5 |
| Description | 5 | 34 | 14.3 |
| Narrative | 14 | 92 | 40.8 |
| 401-450 | 23 | 98 | 51.8 |
| Title | 1 | 4 | 2.5 |
| Description | 5 | 32 | 13.8 |
| Narrative | 14 | 75 | 35.5 |

FIG. 5A

| | TREC5 | WSJ | AP | WT10g | Robust | GOV2 |
|---|---|---|---|---|---|---|
| Clarity | .490[bp] | .607[p] | .596[p] | .380[bp] | .477[p] | .407[p] |
| WIG | .347[p] | .677[b] | .526[bp] | .434[bp] | .411[bp] | .535[b] |
| NQC | .483[bp] | .718[b] | .554[bp] | .486[p] | .575[b] | .432[bp] |
| Clarity(psg) | .264[bp] | .629[p] | .622[p] | .289[bp] | .477[p] | .395[p] |
| WIG(psg) | .344[p] | .576[bp] | .397[bp] | .494[bp] | .435[bp] | .468[b] |
| NQC(psg) | .292[bp] | .497[b] | .304[bp] | .488[p] | .401[bp] | .220[bp] |
| PIQ1 | .567[c] | .677 | .684[c] | .518[c] | .577[c] | .465[c] |
| PIQ2 | .549[c] | .689 | .690[c] | .522[c] | .582[c] | .480[c] |
| C-PIQ1 | .613[c] | .718[c] | .694[c] | .532[c] | .585[c] | .501[c] |
| C-PIQ2 | .598[c] | .721[c] | .701[c] | .535[c] | .590[c] | .530[c] |
| WPM2 | .738[w] | .725[w] | .738[w] | .540[w] | .640[w] | .655[w] |
| WPM2+PI | .789[w] | .747[w] | .768[w] | .562[w] | .652[w] | .665[w] |

FIG. 5B

| | TREC5 | WSJ | AP | WT10g | Robust | GOV2 |
|---|---|---|---|---|---|---|
| Clarity | .254[p] | -.005[bp] | .174[bp] | .381[bp] | .288[bp] | .381[bp] |
| WIG | .011[bp] | .368[bp] | .510[p] | .377 | .278[bp] | .303[bp] |
| NQC | .271[bp] | .642 | .528[bp] | .397[bp] | .461[bp] | .360[p] |
| Clarity(psg) | .256[p] | .586[bp] | .605[bp] | .267[bp] | .468[bp] | .446[bp] |
| WIG(psg) | .292[bp] | .588[bp] | .526[p] | .377 | .446[bp] | .343[bp] |
| NQC(psg) | .338[bp] | .640 | .545[bp] | .418[bp] | .499[bp] | .361[p] |
| PIQ1 | .512[p] | .655[c] | .637[c] | .464[c] | .550[c] | .460[c] |
| PIQ2 | .521[p] | .674[c] | .662[c] | .479[c] | .548[c] | .475[c] |
| C-PIQ1 | .528 | .678[c] | .689[c] | .476[c] | .624[c] | .482[c] |
| C-PIQ2 | .535 | .684[c] | .703[c] | .527[c] | .631[c] | .501[c] |
| WPM2 | .732[w] | .650[w] | .621[w] | .406[w] | .587[w] | .509[w] |
| WPM2+PI | .745[w] | .664[w] | .734[w] | .492[w] | .612[w] | .525[w] |

FIG. 6A

|                | TREC5 | WSJ   | AP    | WT10g | Robust | GOV2  |
|----------------|-------|-------|-------|-------|--------|-------|
| d-dispersion   | .091  | .095  | .259  | .174  | .275   | -.234 |
| d-cohesion     | -.093 | -.096 | -.256 | -.170 | -.254  | .239  |
| e-dispersion   | -.035 | -.277 | -.402 | .167  | .154   | -.121 |
| e-cohesion     | .032  | .274  | .404  | -.168 | -.151  | .118  |
| list-PI[max]   | .462* | .640* | .420  | .417* | .487*  | .346* |
| list-PI[avg]   | .433* | .629* | .543* | .457* | .453*  | .332* |
| list-PI[std]   | .442* | .635* | .510* | .469* | .506*  | .340* |

FIG. 6B

|                | TREC5 | WSJ   | AP    | WT10g | Robust | GOV2  |
|----------------|-------|-------|-------|-------|--------|-------|
| d-dispersion   | -.075 | .139  | .177  | -.055 | -.138  | -.189 |
| d-cohesion     | .078  | -.141 | -.179 | .053  | .136   | .191  |
| e-dispersion   | .127  | -.259 | -.480 | -.041 | -.129  | -.085 |
| e-cohesion     | -.130 | .257  | .478  | .043  | .131   | .087  |
| list-PI[max]   | .359* | .673* | .572* | .364* | .427*  | .321* |
| list-PI[avg]   | .406* | .694* | .623* | .335* | .462*  | .335* |
| list-PI[std]   | .483* | .718* | .644* | .398* | .499*  | .401* |

FIG. 8

|  |  | TREC5 | WSJ | AP | WT10g | Robust | GOV2 |
|---|---|---|---|---|---|---|---|
| 200 chars | Clarity(pxg) | .192 | .673 | .608 | .301 | .442 | .408 |
|  | WIG(pxg) | .365 | .601 | .533 | .414 | .461 | .472 |
|  | NQC(pxg) | .261 | .637 | .568 | .386 | .512 | .332 |
|  | PIQ1 | .512* | .686* | .686* | .393 | .554* | .471 |
|  | PIQ2 | .526* | .638 | .676* | .427* | .530* | .485* |
| 400 chars | Clarity(pxg) | .181 | .632 | .575 | .266 | .378 | .397 |
|  | WIG(pxg) | .317 | .637 | .521 | .392 | .464 | .465 |
|  | NQC(pxg) | .331 | .696 | .596 | .404 | .501 | .235 |
|  | PIQ1 | .464* | .698 | .675* | .433* | .521* | .461 |
|  | PIQ2 | .461* | .663 | .631* | .454* | .536* | .476* |

FIG. 9

|  |  | TREC5 | WSJ | AP | WT10g | Robust | GOV2 |
|---|---|---|---|---|---|---|---|
| TF-IDF | Clarity(pxg) | .065 | .591 | .602 | .162 | .249 | .202 |
|  | WIG(pxg) | .085 | .639 | .661 | .239 | .342 | .289 |
|  | NQC(pxg) | .113 | .664 | .641 | .226 | .424 | .318 |
|  | PIQ1 | .318* | .685* | .636 | .427* | .499* | .427* |
|  | PIQ2 | .379* | .664 | .695* | .457* | .505* | .431* |
| PDQ | Clarity(pxg) | .166 | .554 | .607 | .256 | .489 | .359 |
|  | WIG(pxg) | .313 | .331 | .174 | .280 | .341 | .278 |
|  | NQC(pxg) | .206 | .218 | .130 | .298 | .416 | .312 |
|  | PIQ1 | .423* | .652* | .681* | .410* | .527* | .430* |
|  | PIQ2 | .427* | .587* | .650* | .380* | .511* | .422* |
| BM25 | Clarity(pxg) | .256 | .586 | .605 | .267 | .468 | .446 |
|  | WIG(pxg) | .292 | .588 | .526 | .377 | .446 | .343 |
|  | NQC(pxg) | .338 | .640 | .545 | .458 | .499 | .361 |
|  | PIQ1 | .512* | .655* | .637* | .464* | .559* | .460* |
|  | PIQ2 | .521* | .674* | .662* | .479* | .565* | .475* |

EXTENDED QUERY PERFORMANCE PREDICTION FRAMEWORK UTILIZING PASSAGE-LEVEL INFORMATION

STATEMENT REGARDING PRIOR DISCLOSURES BY AN INVENTOR

Haggai Roitman, "An Extended Query Performance Prediction Framework Utilizing Passage-Level Information," Proceedings of the 2018 ACM SIGIR International Conference on Theory of Information Retrieval (ICTIR '18), September 2018, p. 35-42, and Haggai Roitman, "Query performance prediction using passage-level information," Proceedings of 41st International ACM SIGIR Conference on Research & Development in Information Retrieval (SIGIR '18), June 2018, p. 893-896, the disclosures of which are incorporated by reference herein, are submitted herewith and cited in an accompanying Information Disclosure Statement (IDS). The author of these papers is named as an inventor in the present application, and these papers were not published or otherwise made available to the public more than one year before the filing of the present application.

BACKGROUND

The present invention relates to the electrical, electronic and computer arts, and, more particularly, to improvements in query performance prediction.

Query performance prediction (QPP) is a core information retrieval (IR) task whose primary goal is to assess retrieval quality in the absence of relevance judgements. Thus, in the absence of relevance judgements, the goal of the query performance prediction (QPP) task is to estimate the expected effectiveness that would be "gained" from evaluating a given query q over corpus C. Therefore, a reasonable QPP method should be such whose predicted values correlate as much as possible with the actual query performance. Many QPP methods have been proposed so far and can be roughly classified into pre-retrieval methods, post-retrieval methods, and their combinations. Pre-retrieval QPP methods only make use of properties of the query q and the corpus C for prediction, while post-retrieval QPP methods further utilize properties of the retrieved result list and the documents contained therein. Post-retrieval QPP tries to determine the likelihood that a result list (D), of the most highly ranked documents, is relevant to a query (q).

Most previous QPP research has focused on ad-hoc retrieval prediction tasks that involved short (keyword-based) queries, such as "hydrogen fuel automobiles." Verbose queries are long and informative queries, which are typically expressed in natural language, such as "identify documents that discuss the use of hydrogen as a fuel for piston driven automobiles or the use of hydrogen in fuel cells to generate electricity to drive a car." With the emergence of new "conversational" search interfaces (especially voice and dialog), verbose queries are becoming increasingly common. However, existing state-of-the-art post-retrieval QPP methods, whose core design principles are mainly based on the analysis of document-level properties, are mostly suited for short query prediction tasks: such methods perform significantly worse in verbose query prediction settings. There is a need for the design of more robust QPP methods that are less sensitive to query length.

SUMMARY

An illustrative embodiment includes a method for post-retrieval query performance prediction using hybrid document-passage information. The method includes: obtaining a set of documents responsive to a specific query; extracting document-level information regarding respective documents within the set; extracting passage-level information regarding respective passages of documents within the set; and estimating a likelihood that the set of documents includes relevant information to the specific query using both the document-level information and the passage-level information.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 is a table summarizing properties of corpora used to generate the experimental results shown in FIGS. 4-9;

FIGS. 2A-2D are tables providing more detailed data regarding constituent components within some of the corpora shown in FIG. 1;

FIGS. 3A-3D are tables showing length statistics for topics corresponding to the corpora discussed above with reference to FIGS. 2A-2D, further broken down by topic section;

FIG. 4 is a bar graph showing an empirical evaluation of conventional document-level QPP techniques for short queries and verbose queries;

FIG. 5A is a table of experimental results evaluating prediction quality for short queries according to an embodiment of the present invention;

FIG. 5B is a table of experimental results evaluating prediction quality for verbose queries according to an embodiment of the present invention;

FIG. 6A is a table of experimental results showing a comparison of various alternative $p(r|D)$ estimators over short queries according to an embodiment of the present invention;

FIG. 6B is a table of experimental results showing a comparison of various alternative p(r|D) estimators over verbose queries according to an embodiment of the present invention;

FIG. 8 is a table showing experimental results comparing prediction quality for passage-level QPP alternatives over verbose queries when using short passages vs. long passages according to an embodiment of the present invention;

FIG. 9 is a table showing experimental results comparing prediction quality for passage-level QPP alternatives over verbose queries when using different passage scoring models according to an embodiment of the present invention.

DETAILED DESCRIPTION

Figures 3C, 3D, 4:
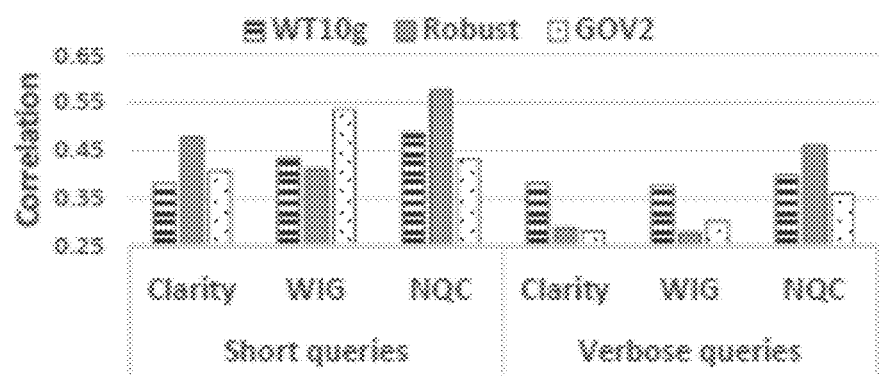

Let q denote a query and let C denote a corpus on which the query is evaluated using some underlying retrieval model. For a given text x (e.g., a document d or a passage g), let $s_q(x)$ denote a (retrieval) score assigned to x given q. Accordingly, let D denote the top-k documents in C with the highest retrieval score $s_q(d)$, as determined by the underlying retrieval method.

As previously noted, existing post-retrieval QPP methods that only focus on document-level features are not fully suited to the verbose-QPP task: these methods are mostly suited for short query prediction tasks with significantly worse performance in verbose (long and informative) query prediction settings. Thus, utilizing passage-level information within the design of post-retrieval QPP methods for such a dedicated QPP sub-task is highly important. To address the prediction quality gap among query lengths, embodiments of the present invention provide a novel passage-level post-retrieval QPP framework. Empirical analysis demonstrates that QPP methods that utilize passage-level information are much better suited for verbose QPP settings.

Embodiments of the present invention utilize passage-level information extracted from documents in D as an additional source for QPP. Relevant passage-level information obtained within documents of the retrieved result list may provide valuable evidence whether a given retrieval was (overall) effective or not. Moving from a document-level analysis to a more fine-granular passage-level one would basically allow us to predict query performance based on more focused relevance "cues."

A straight-forward way of leveraging passage-level information is to directly utilize previous frameworks for pure passage-level prediction. Instead of considering documents in d ∈ D as the input to a given post-retrieval predictor, an illustrative embodiment can instead consider the passages g contained within these documents. In other words, existing QPP methods can be implemented with highly-scored passages within retrieved documents taking the place of the documents themselves for predictive purposes. As described in, e.g., Steve Cronen-Townsend et al., "Predicting query performance," Proceedings of the 25th Annual International ACM SIGIR Conference on Research and Development in Information Retrieval (SIGIR '02), August 2002, p. 299-306, the disclosure of which is incorporated by reference herein, the Clarity method estimates query performance according to the divergence between the relevance model induced from D and the background model induced from C. In Clarity(psg), the relevance model is induced from passages g ∈ D.

As described in, e.g., Yun Zhou et al., "Query performance prediction in web search environments," Proceedings of the 30th Annual International ACM SIGIR Conference on Research and Development in Information Retrieval (SIGIR '07), July 2007, p. 543-550 (hereinafter "Zhou"), the disclosure of which is incorporated by reference herein, the WIG (Weighted Information Gain) method estimates query performance according to the difference between the average retrieval score from D and that of C. In WIG(psg), the retrieval scores of passages (i.e., $s_q(g)$; g ∈ D) are considered instead of documents. As described in, e.g., Anna Shtok et al., "Predicting query performance by query-drift estimation," ACM Transactions on Information Systems (TOIS): v. 30, n. 2, May 2012, p. 11:1-11:35, the disclosure of which is incorporated by reference herein, the NGC (Normalized Query Commitment) method estimates query performance according to the standard deviation of the retrieval scores of documents in D, further normalized by the corpus score $s_q(C)$. In NGC(psg), the retrieval scores of passages are considered.

Steve Cronen-Townsend et al., "Precision prediction based on ranked list coherence," Information Retrieval, vol. 9, no. 6, December 2006, p. 723-755 (hereinafter "Cronen-Townsend") and Eyal Krikon et al., "Predicting the performance of passage retrieval for question answering," Proceedings of the 21st ACM International Conference on Information and Knowledge Management (CIKM '12), October 2012, p. 2451-2454 (hereinafter "Krikon"), the disclosures of which are incorporated by reference herein, have predicted the outcome of passage retrieval for question answering tasks. However, as further discussed below, predictors that utilize a pure passage-level prediction approach (as in Cronen-Townsend and Krikon) are less suited for the document retrieval QPP task. Embodiments of the present invention in which hybrid approaches utilize both document-level and passage-level information provide a more robust prediction which is less sensitive to query length.

Illustrative embodiments of the present invention can build upon the probabilistic QPP framework discussed in Oren Kurland et al., "Back to the roots: A probabilistic framework for query-performance prediction," Proceedings of the 21st ACM international conference on Information and knowledge management (CIKM '12), October 2012, p. 823-832 (hereinafter "Kurland"), the disclosure of which is incorporated by reference herein. Specifically, illustrative embodiments of the present invention extend Kurland with passage-level information, resulting in a new hybrid passage-document level prediction approach with enhanced prediction.

The post-retrieval QPP task is to estimate p(D|q,r)—the likelihood that D contains relevant information to query q. Kurland's probabilistic QPP framework estimates this likelihood according to a combination of the relevance likelihood of the result list as a whole, the documents which form the result list, and the relationship therebetween. More particularly, Kurland teaches that, after some simplifications, p(D|q,r) may be estimated as follows:

$$\hat{p}(D|q,r) \stackrel{\text{def}}{=} p(r|D)\Sigma_{d \in D}p(d|D,R)p(d|q,r) \quad \text{(hereinafter "Equation1")}.$$

The term p(d|q,r) denotes document d's likelihood of being a relevant response to query q. This term may be estimated proportionally to document d's retrieval score $s_q(d)$. The term p(r|D) denotes the likelihood that D contains relevant information (independently of query q). This term may be estimated according to list D's cohesion or dispersion properties. The term p(d|D,r) further captures the relationship between a given document d and the (presumably) "relevant" results list D. This term may be estimated as $$\hat{p}(d \mid D, r) = \log \frac{\hat{p}(d \mid R_{[D]})}{\hat{p}(d \mid C)},$$

i.e., the log-likelihood ratio between generating document d by D's induced relevance model vs. generating it by the corpus C (background) model.

For a first hybrid passage-document QPP method, denoted PIQ1 (Passage-Information based QPP), assume only for now that both p(r|D) and p(d|D,r) are uniformly distributed. Applying the assumption into Equation1 produces:

$$\hat{p}(D|q,r) \propto \Sigma_{d \in D} p(d|q,r) \quad \text{(hereinafter "Equation2")}.$$

Moreover, $\hat{p}(D|q,r)$ can be realized using passage-level information. As a first step:

$$\hat{p}(d \mid q, r) \stackrel{def}{=} \frac{p(q \mid d, r)p(r \mid d)p(d)}{p(r \mid q)p(q)}. \quad \text{(hereinafter "Equation 3")}$$

Next, assume that: p(q) is uniformly distributed;

$$\hat{p}(d) \stackrel{def}{=} \frac{1}{|D|}$$

is uniformly distributed over D; and $\hat{p}(q|d, r) \stackrel{def}{=} s_q(d)$. Applying these assumptions back into Equation3, the PIQ1 estimator can be derived according to Equation2 as follows:

$$\hat{p}(D \mid q, r) \stackrel{def}{=} \frac{1}{|D|} \Sigma_{d \in D} s_q(d) \frac{p(r \mid d)}{p(r \mid q)}. \quad \text{(hereinafter "Equation 4")}$$

The term p(r|d) denotes the likelihood that document d contains relevant information regardless of any specific query. Previously, this term has been estimated according to document-level properties, such as document length or entropy. However, embodiments of the present invention provide an alternative estimation of this term based on passage-level information using a MaxPsg approach. See, e.g., Michael Bendersky et al., Utilizing passage-based language models for document retrieval, Proceedings of the 30th European Conference on Advances in Information Retrieval (ECIR'08), Lecture Notes in Computer Science (LNCS) 4956, March-April 2008, p. 162-174 (hereinafter "Bendersky"), and Xiaoyong Liu et al., Passage retrieval based on language models, Proceedings of the Eleventh International Conference on Information and Knowledge Management (CIKM '02), November 2002, p. 375-382 (hereinafter "Liu"), the disclosures of which are incorporated by reference herein. For example, to estimate the likelihood that a given document will be relevant in general, an embodiment may score the passages of that document with respect to the query, their own general relevance, and their relationship with their containing documents. p(r|d) can be estimated based on a single representative passage g ∈ d, as follows:

$$\hat{p}(r \mid d) \stackrel{def}{=} \max_{g \in d} s_q(g) p(r \mid g) p(g \mid d). \quad \text{(hereinafter "Equation 5")}$$

$s_q(g)$ is the query score assigned to passage g (∈ d). p(r|g) represents the likelihood that passage g contains relevant information. This term may be estimated as a combination of two sub-terms as follows:

$$\hat{p}(r|g) \stackrel{def}{=} H(g) \cdot posBias(g) \quad \text{(hereinafter "Equation6")}.$$

$H(g) \stackrel{def}{=} \Sigma_{w \in g} \hat{p}^{[0]}(w|g)$ is the entropy of passage g's unsmoothed language model—preferring more diverse passages.

$$posBias(g) \stackrel{def}{=} 1 + \frac{1}{\log(2 + g \cdot s)},$$

where g·s denotes the start position (in character offsets) of passage g within its containing document. Hence, posBias (g) prefers passages that are located as early as possible within their containing documents. See, e.g., Guy Feigenblat et al., "Unsupervised query-focused multi-document summarization using the cross entropy method," Proceedings of the 40th International ACM SIGIR Conference on Research and Development in Information Retrieval (SIGIR '17), August 2017, p. 961-964, the disclosure of which is incorporated by reference herein.

p(g|d) in Equation5 further captures the relationship between passage g and its containing document d, estimated using Bhattacharya similarity as $p(g|d) \stackrel{def}{=} sim_B(g, d)$ where $sim_B(x, x') \stackrel{def}{=} \Sigma_w \sqrt{\hat{p}^{[0]}(w|x)\hat{p}^{[0]}(w|x')}$. Finally, similarly to many other post-retrieval QPP methods, p(r|q) is a query-sensitive normalization term, which may be estimated according to q's length: $\hat{p}(r|q) \stackrel{def}{=} \sqrt{|q|}$.

For a second hybrid passage-document QPP method, denoted PIQ2, the previous uniformity assumptions about p(r|D) and p(d|D,r) are relaxed, and these two terms are directly estimated using passage-level information. Applying this relaxation into Equation4 produces the following alternative PIQ2 estimator:

$$\hat{p}(D \mid q, r) \stackrel{def}{=} \frac{1}{|D|} \Sigma_{d \in D} s_q(d) \frac{p(r \mid d)p(d \mid D, r)p(r \mid D)}{p(r \mid q)}. \quad \text{(hereinafter "Equation 7")}$$

Here, again, p(r|d) is estimated according to Equation5 and Estimators for p(r|D) and $\hat{p}(r|q) \stackrel{def}{=} \sqrt{|q|}$. p(d|D,r) may now be derived. To this end, a MaxPsg approach again can be employed over passages contained in documents d ∈ D, where p(r|D) is estimated as follows:

$$\hat{p}(r \mid D) \stackrel{def}{=} \max_{g \in D} s_q(g) p(r \mid g) p(g \mid D). \quad \text{(hereinafter "Equation 8")}$$

The term p(r|g) is estimated again according to Equation6, and captures the relationship $p(g|D) \stackrel{def}{=} sim_B(g,D)$ between passage g and D using Bhattacharya similarity. For the latter term, D may be represented by its centroid language model, which may be calculated as $$\hat{p}^{[0]}(w \mid D) \stackrel{def}{=} \frac{1}{|D|} \Sigma_{d \in D} \hat{p}^{[0]}(w \mid d)$$

As further discussed below, Equation8 provides a better estimation of p(r|D) compared to that of the estimators previously suggested in, e.g., David Carmel et al., "What makes a query difficult?," Proceedings of the 29th Annual International ACM SIGIR Conference on Research and Development in Information Retrieval (SIGIR '06), August 2006, p. 390-397 (hereinafter "Carmel"), the disclosure of which is incorporated by reference herein, and Kurland.

Next, utilizing yet another time a MaxPsg estimation approach, the term p(d|D,r) may be estimated as follows:

$$\hat{p}(d \mid D, r) \stackrel{def}{=} \max_{g \in D} s_q(g) p(d \mid g, r) p(g \mid D, r),$$ (hereinafter "Equation 9")

where:

$$\hat{p}(d \mid g, r) \stackrel{def}{=} \frac{\hat{p}(g \mid d, r)}{\Sigma_{g' \in d} \hat{p}(g' \mid d, r)} \text{ and}$$

$$\hat{p}(g \mid X, r) \stackrel{def}{=} \log \frac{\hat{p}(g \mid R_{[X]})}{\hat{p}(g \mid C)} \text{ for } X \in \{\{d\}, D\}.$$

Here, passage g is treated as a "query" and is calculated similarly to query-likelihood.

Haggai Roitman et al., "Enhanced mean retrieval score estimation for query performance prediction," Proceedings of the ACM SIGIR International Conference on Theory of Information Retrieval (ICTIR '17), October 2017, p. 35-42 (hereinafter "Roitman17"), the disclosure of which is incorporated by reference herein, recently proposed an extension to Kurland. Roitman17 derived a generic calibrated (discriminative) mean retrieval score estimator for post-retrieval tasks. According to Roitman17, many of the previously-suggested post-retrieval predictors (e.g., Clarity, WIG, etc.) share the following basic form:

$$\hat{p}(D \mid q, r) \stackrel{def}{=} \frac{1}{|D|} \sum_{d \in D} s_q(d) \cdot \phi_{r,F}(d),$$ (hereinafter "Equation 10")

where $\phi_{r,F}(d) \stackrel{def}{=} \Pi_j(f_j(d))^{\alpha_j}$ is a WPM (Weighted Product Model) discriminative calibrator. $f_j(d)$ represents some retrieval quality feature and $\alpha_j \geq 0$ denotes its relative importance. Within this framework, $\phi_{r,F}(d)$ calibrates each document $d \in D$ according to the likelihood of d being a relevant response to query q. To this end, $\phi_{r,F}(d)$ may encode various retrieval quality properties, such as properties of q, C, D, and the document d itself. Some these properties may be complementing each other (e.g., query vs. corpus quality effects) and therefore, tradeoffs in the design of general QPP methods should be properly modeled. $\phi_{r,F}(d)$ can model such tradeoffs (i.e., using the weights $\alpha_j$).

Each of the two PIQ predictor variants heretofore described is essentially a calibrated mean retrieval score estimator as discussed in Roitman17. The first predictor, PIQ1 (discussed above with reference to Equation4), utilizes two calibration features, namely $f_1(d)=p(r|d)$ and $f_2(d)=1/p(r|q)$: both features are assigned equal weights of $\alpha_1=\alpha_2=1$. $f_1(d)$ denotes how relevant document d is in general, while $f_2(d)$ provides query-sensitive normalization. Thus, PIQ1 can calibrate document scores based on an estimation of each document's own relevance.

The second predictor, PIQ2 (discussed above with reference to Equation7), utilizes two additional calibration features, namely $f_3(d)=p(r|D)$ and $f_4(d)=p(d|D,r)$, with similar uniform weights $\alpha_3=\alpha_4=1$. These features capture list-level and document-list quality effects based on passage information: $f_3(d)$ denotes how relevant result list D is in general, while $f_4(d)$ denotes how likely one is to observe document d in a relevant result list D. Thus, PIQ2 further calibrates document scores based on the result list's relevance and its relationship with the document, assuming it is an effective list. Calibrating the various feature weights within predictors PIQ1 and PIQ2 can significant boost improve their performance and boost prediction quality. Thus, C-PIQ1 and C-PIQ2 represent calibrated versions of the PIQ1 and PIQ2 methods, respectively.

Roitman17 describes a predictor WPM2 which utilizes 10 different document retrieval score calibration features, whose weights need to be learned, and achieves the best reported QPP accuracy. Except for $f_2(d)$, which provides query-sensitive normalization, the other three calibration features discussed above with reference to PIQ1 and PIQ2 are utilizing passage-level information. These three new passage-based calibration features can be used within Roitman17's QPP framework to significantly boost prediction quality, even in cases where it was already relatively high. WPM2+PI represents an extension of Roitman17's WPM2 method with the passage-level calibration features described herein.

Thus, an illustrative embodiment may include a query performance prediction method for verbose queries (e.g., queries that are long and informative) which utilizes a novel set of three passage-level (document) score calibration signals. The first signal p(r|d), per document, estimates the existence of relevant information through a single document's representative passage (one that has the highest score to the query) and uses the passage's own relevance estimate (measured by combination of passage language model entropy and position within its document). See Equation5 and Equation6 above. The second signal p(d|D,r) uses a single passage from the document to measure whether the document can explain the existence of relevant information within the document set that was retrieved for the query as a whole. For that, the representative passage may be chosen similarly to before, with a further measurement of the similarity of that "relevant" passage to the document and to the relevance model derived for the whole document set. See Equation9 above. The third signal p(r|D) estimates the likelihood that the whole document set retrieved for the query contains relevant information. For that, the representative passage is again chosen similar to the first two signals, with a further measurement of the similarity of that passage to the centroid language model of the whole document set. See Equation8 above. These three passage-level signals are combined using their weighted product and multiplied in the document retrieval score. The query performance prediction may be obtained by averaging such estimates over all documents in the document set. See Equation7 above.

Experimental results obtained by evaluating an illustrative embodiment of the present invention are described with reference to FIGS. 1-9. These experimental results were produced by applying a plurality of QPP methods while executing a given set of queries on a given corpus. As a baseline, the commonly-used Clarity, WIG, and NGC techniques, which use only document-level data, were evaluated. The Clarity(psg), WIG(psg), and NQC(psg) variants of these techniques discussed above, which use only passage-level data, were also evaluated. The hybrid techniques PIQ1 and PIQ2 discussed above in reference to an aspect of the present invention, which use both document-level data and passage-level data, were evaluated as were the calibrated (supervised) variants of these techniques, C-PIQ1 and C-PIQ2. Another calibrated (supervised) technique which was evaluated was the WPM2 technique taught by Roitman17, as well as the WPM2+PI variant discussed above, which is a hybrid technique incorporating passage-level information according to an aspect of the present invention.

These experiments utilized corpora (and sets of topics corresponding to the corpora) constructed in connection with past instances of the annual Text Retrieval Conference (TREC) run by the National Institute for Standards and Technology (NIST) within the United States Department of Commerce. FIG. 1 is a table summarizing the corpora used to generate the experimental results shown in FIGS. 4-9, while FIGS. 2A-2D are tables providing more detailed data regarding constituent components within some of the corpora in FIG. 1. With reference to FIGS. 2A-2D, note that "words" are merely strings of alphanumeric characters; no stop words were removed and no stemming was performed.

AP denotes a corpus including stories from the *Associated Press Newswire*, and WSJ denotes a corpus including articles from the *Wall Street Journal* newspaper, as enumerated in FIGS. 2A and 2B, respectively. While these corpora cover a wide variety of knowledge domains, there is a strong contrast in their format, style, and level of editing. For example, the documents in the AP corpus are of similar length (the median and the mean length are close), but the WSJ corpus includes documents with a wider range of lengths. TREC5 denotes a corpus comprising documents from various sources listed in FIG. 2C, with a set of 50 topics (251-300) corresponding thereto, which were used for the ad hoc track of the fifth TREC, which took place at the NIST in November 1996. The constituent components of these corpora, and the topics indicated as corresponding to each corpus, are described in, for example, Ellen M. Voorhees et al., "Overview of the Fifth Text REtrieval Conference (TREC-5)," Proceedings of the Fifth Text Retrieval Conference, NIST Special Publication 500-238, November 1997, p. 1-28 (hereinafter "TREC-5"), which is incorporated by reference herein.

Robust denotes a corpus comprising documents from various sources, with a set of 250 topics (301-450 and 601-700) corresponding thereto, which were used for the robust track of the thirteenth TREC, which took place at the NIST in November 2004. Further description of this corpus and topics may be found in, e.g., Ellen M. Voorhees, "Overview of TREC 2004," Proceedings of the Thirteenth Text Retrieval Conference, NIST Special Publication 500-261, August 2005, p. 1-15 (hereinafter "TREC-13"), and Ellen M. Voorhees, "Overview of the TREC 2004 Robust Retrieval Track," Proceedings of the Thirteenth Text Retrieval Conference, NIST Special Publication 500-261, August 2005, p. 70-79, the disclosures of which are incorporated by reference. Additional details regarding the constituent components of the Robust corpus, as shown in FIG. 2D, may be found in Ellen M. Voorhees et al., "Overview of the Sixth Text Retrieval Conference (TREC-6)," Proceedings of the Sixth Text Retrieval Conference, NIST Special Publication 500-240, August 1998, p. 1-24 (hereinafter "TREC-6"), the disclosure of which is incorporated by reference herein, as well as the previously-cited TREC-5.

The corpora discussed thus far (e.g., AP, WSJ, TREC5, and Robust) are composed primarily of newswire documents. In contrast, the remaining corpora shown in FIG. 1, WT10g and GOV2 are composed of web pages. WT10g includes 1,692,096 pages with 8,062,918 links, for a link density of 4.77, while GOV2 includes 25,205,179 pages with 82,711,345 links, for a link density of 3.28. WT10g is a small sample of a large set of web sites crawled in 1997, primarily in the .com domain, and contains some pages of low quality (e.g., spam). GOV2 is a much larger collection of web data crawled from web sites in the .gov domain during early 2004, and hence contains mainly well edited pages. WT10g is an artificial selection from a large crawl of the whole web, while GOV2 is a natural (albeit) truncated crawl of a limited but interesting web domain.

More specifically, WT10g denotes a corpus comprising web pages (e.g., information returned by an http daemon, as well as page content), with a set of 100 topics (451-550) corresponding thereto, which were used for the web track of the tenth TREC, which took place at the NIST in November 2001. WT10g is a sample subset of a snapshot of the web in 1997, with the sample specifically selected so as to have naturally-defined sub-collections contained within the collection and a good closed set of hyperlinks with a high proportion of links between servers. WT10g is further described in, e.g., Ellen M. Voorhees et al., "Overview of TREC 2001," Proceedings of the Tenth Text Retrieval Conference, NIST Special Publication 500-250, May 2002, p. 1-15 (hereinafter "TREC-10"); David Hawking et al., "Overview of the TREC-2001 Web Track," Proceedings of the Tenth Text Retrieval Conference, NIST Special Publication 500-250, May 2002, p. 61-67; and Peter Bailey et al., "Engineering a multi-purpose test collection for Web retrieval experiments," *Information Processing and Management*, v. 39, n. 6, November 2003, p. 853-871, the disclosures of which are incorporated by reference herein.

GOV2 denotes a corpus comprising web content, with a set of 150 topics (701-850) corresponding thereto, which were used for the terabyte track of the fifteenth TREC, which took place at the NIST in November 2006. GOV2 is believed to includes a large proportion of the crawlable pages in the .gov domain during early 2004, including HTML and text, along with the extracted contents of portable document format (PDF), Word, and PostScript files. GOV2 is further described in, e.g., Ellen M. Voorhees, "Overview of TREC 2006," Proceedings of the Fifteenth Text Retrieval Conference, National Institute of Standards and Technology (NIST) Special Publication 500-272, October 2007, p. 1-16 (hereinafter "TREC-15"); Stefan Biittcher et al., "Overview of the TREC 2006 Terabyte Track," Proceedings of the Fifteenth Text Retrieval Conference, National Institute of Standards and Technology (NIST) Special Publication 500-272, October 2007, p. 128-141; and Nick Craswell, GOV2 Test Collection, May 2004, 2 pages, the disclosures of which are incorporated by reference herein.

Note that each of the corpora shown in FIG. 1 has a corresponding set of topics associated therewith. The topics for a given TREC corpus are selected such that the corpus includes a set of documents relevant to each of the topics. A given TREC topic includes, inter alia, a title, a description, and a narrative. The title consists of a few key words that best describe the topic, and may be similar to a query entered into a web search engine. (In some cases, the topic title may be an actual web query taken from search engine logs, from which the remaining fields are reverse engineered by human assessors.) The description is a longer statement of the topic requirements (i.e., the information need) in the form of a complete sentence or a question. However, the "description" field does not necessarily contain all of (or even any of) the "title" words that were specifically chosen to represent the core meaning of the topic. The narrative, which may be a full paragraph in length, further specifies criteria for what makes a document relevant to the topic (e.g., examples and/or restrictions). As opposed to the description fields which were typically determined prior to actual searching or looking at data, the narrative sections were often constructed by looking at relevant documents in the trial sample and determining what kinds of information were needed to be provided for the topic. See, e.g., Ellen M. Voorhees et al., "Overview of the Eighth Text REtrieval Conference (TREC-8)," Proceedings of the Eighth Text Retrieval Conference, NIST Special Publication 500-246, November 2000, p. 1-23 (hereinafter "TREC-8"), the disclosure of which is incorporated by reference herein.

FIGS. 3A-3D are tables showing length statistics (minimum, maximum, and mean lengths) for topics corresponding to the corpora discussed above with reference to FIGS. 2A-2D, further broken down by topic section (title, description, and narrative). The lengths in FIGS. 3A-3D count the number of tokens in a topic statement (or section thereof) including stop words. FIG. 3A shows statistics for topics 51-150 corresponding to the AP corpus shown in FIGS. 1 and 2A. FIG. 3B shows statistics for topics 151-200 corresponding to the WSJ corpus shown in FIGS. 1 and 2B. FIG. 3C shows statistics for topics 251-300 corresponding to the TREC5 corpus shown in FIGS. 1 and 2C. FIG. 3C shows statistics for topics 301-450, which are among those corresponding to the Robust corpus shown in FIGS. 1 and 2C.

As discussed in, e.g., TREC-10 at page 3, TREC-13 at page 2, and TREC-15 at page 3, "TREC distinguishes between a statement of information need (the topic) and the data structure that is actually given to a retrieval system (the query). The TREC test collections provide topics to allow a wide range of query construction methods to be tested . . . . The different parts of the TREC topics allow researchers to investigate the effect of different query lengths on retrieval performance." Thus, when conducting the experiments described herein, for a given TREC topic, a short query was generated based on the "title" field, and a verbose query was generated based on the "description" field. Per each evaluated TREC topic, both query types express approximately the same information need.

In the experimental setup, the Lucene™ open source library, available from the Apache Software Foundation, was used for indexing and searching documents. See, e.g., Apache Software Foundation, Apache Lucene Core, December 2018, 2 pages, the disclosure of which is incorporated by reference herein. Documents and queries were processed using Lucene's English text analysis (e.g., tokenization, Porter stemming, stopwords, etc.) The underlying retrieval method was Lucene's Dirichlet-smoothed query-likelihood implementation, with the Dirichlet parameter fixed to $\mu=1000$ (i.e., QL[$\mu=1000$]), as in Kurland and Roitman17.

As previously noted, the various methods were evaluating using two difference query settings: short keyword queries based on topic titles, and long verbose queries based on topic descriptions. The performance of each query (short and long) was predicted based on its top-100 retrieved documents. Prediction was assessed over queries quality according to the Pearson's-p correlation between the predictor's values and the actual average precision (AP@1000) values calculated using TREC's relevance judgments.

Next, in order to realize the various passage-level predictors, for each retrieved document $d \in D$, its passages $g \in d$ must be extracted. In an illustrative embodiment, each retrieved document's passages are extracted using a fixed $L=500$ character-windowing approach, as described in, e.g., Stefanie Tellex et al., "Quantitative evaluation of passage retrieval algorithms for question answering," Proceedings of the 26th Annual International ACM SIGIR Conference on Research and Development in Information Retrieval (SIGIR '03), July 2003, p. 41-47 (hereinafter "Tellex"), the disclosure of which is incorporated by reference. As described in, e.g., Mathias Géry et al., "Bm25t: A bm25 extension for focused information retrieval, Knowledge and Information Systems," v. 32, n. 1, July 2012, p. 217-241 (hereinafter "Géry"), the disclosure of which is incorporated by reference, an illustrative embodiment may use Okapi-BM25 as a baseline passage scoring model (i.e., $s_q(g)$), with $k_1=0.8$ and $b=0.3$. Alternative passage extraction and scoring methods are further discussed hereinbelow.

Most of the QPP methods evaluated herein, including the PIQ and WPM2 variants, require tuning some fine parameter. Common to all methods is the free parameter $k \leq |D|$, which is the number of top scored documents (out of a total of 1000 retrieved documents) to be used for the prediction. To this end, one could select $k \in \{5, 10, 20, 50, 100, 150, 200, 500, 1000\}$. To implement the three passage-level alternatives, the top-m scored passages in D can be used for prediction, with $m \in \{5, 10, 20, 50, 100, 150, 200, 300, 500, 1000\}$. For Clarity, Clarity(psg), PIQ and WPM2 variants, the induced relevance models can be further clipped at the top-n terms cutoff, with $n \in \{5, 10, 20, 50, 100, 150, 200\}$.

To learn the calibration feature weights of C-PIQ1, C-PIQ2, WPM2 and WPM2+PI, a Coordinate Ascent approach can be used in a manner similar to Roitman17. The feature weights are selected as $\{\alpha_j\}_{j=1}^{h}$ in the grid $[0, 5]^h$ with a step size of 0.1 within each dimension, with $h \in \{2, 4, 10, 13\}$ such different features implemented within the C-PIQ1, C-PIQ2, WPM2 and WPM2+PI methods, respectively. Similar to Roitman17, feature values were smoothed $f_j(d; \epsilon) \stackrel{\text{def}}{=} \max(f_j(d), \epsilon)$, where $\epsilon=10^{-10}$ is a hyperparameter.

The methods described herein can be trained and tested using a holdout (2-fold cross validation) approach. Accordingly, on each benchmark, 30 random splits of the query set were generated; each split had two folds. The first fold was used as the (query) train set, while the second fold was kept untouched for testing. The average prediction quality was recorded over the 30 splits. Finally, statistical significant differences of prediction quality were measured using a two-tailed paired t-test with (Bonferroni corrected) $p<0.05$ computed over all 30 splits.

FIG. 4 is a bar graph showing an empirical evaluation of conventional document-level QPP techniques for short queries and verbose queries. More particularly, FIG. 4 shows the prediction quality (measured by correlation to true query performance) of three state-of-the-art post-retrieval QPP methods (Clarity, WIG, and NQC). These methods were evaluated over three common TREC corpora and topics (WT10g, Robust, and GOV2 discussed above with reference to FIGS. 1-3). Each method was evaluated once using short (TREC topic title) queries and again with verbose (TERC topic description) queries. As previously noted, both query types express approximately the same information need relative to a given TREC topic. FIG. 4 clearly shows that, when moving from short query prediction tasks to verbose ones, none of the three methods exhibits a stable performance behavior. Rather, in most cases, QPP quality significantly differs between the two tasks, with lower quality numbers obtained for verbose queries.

These empirical results provide clear evidence that, existing state-of-the-art post-retrieval QPP methods, whose core design principles are mainly based on the analysis of document-level properties, may be mostly suited for prediction tasks that involve short (and probably more ambiguous) queries. Thus, as heretofore discussed, there is a long-felt unmet need for the design of more robust QPP methods that are less sensitive to query length.

FIG. 5A is a table showing experimental results evaluating prediction quality for short queries according to an embodiment of the present invention. The superscript b denotes a statistically significant difference between one of the first document-level baselines and its passage-level counterpart. The superscript p denotes a statistically significant difference between a PIQ variant and the six first baselines (the three pure document-level techniques and the three pure passage-level techniques). The subscript c denotes a statistically significant difference between a PIQ variant and its calibrated version. The subscript w denotes a statistically significant difference between WPM2 and WPM2+PI.

As an initial observation, the three first document-level QPP baselines (i.e., Clarity, WIG, and NQC) and their passage-level counterparts (i.e., Clarity(psg), WIG(psg), and NQC(psg)) exhibited a mixed relative performance. For short queries, document-level QPP methods perform better than pure passage-level methods. This serves an initial indication that passage-level information is an important QPP signal.

Next, in most cases, hybrid prediction approaches, such as PIQ1 and PIQ2, resulted in a better prediction than reliance on either document-level or passage-level features alone. While the baselines either utilize only document-level or only passage-level features, the PIQ variants utilize both feature types. This, therefore, supports again the importance of passage-level QPP signals for the document-level QPP task.

Furthermore, by calibrating the "features" of PIQ1 and PIQ2 in the manner discussed above, further performance enhancement and improved quality of results can be obtained. That said, such calibration also requires more supervision. Comparing PIQ1 to PIQ2 side by side (and similarly C-PIQ1 to C-PIQ2) shows that PIQ2, which considers more diverse passage-level signals, outperformed PIQ1 in most cases.

Overall, WPM2 was the best document-level only QPP method. Yet, through addition of the three passage-level features to WPM2, the WPM2+PI extension has obtained a significant boost in prediction quality. This is a further demonstration of the impact that passage-level QPP signals can have on a document-level QPP task.

FIG. 5B is a table showing experimental results evaluating prediction quality for verbose queries according to an embodiment of the present invention. Again, the superscript b denotes a statistically significant difference between one of the first document-level baselines and its passage-level counterpart. The superscript p denotes a statistically significant difference between a PIQ variant and the six first baselines (the three pure document-level techniques and the three pure passage-level techniques). The subscript c denotes a statistically significant difference between a PIQ variant and its calibrated version. The subscript w denotes a statistically significant difference between WPM2 and WPM2+PI.

Comparing FIG. 5B with FIG. 5A (especially when the data is visualized as in FIG. 4), it becomes clear that it becomes clear that those baseline methods that only utilize document-level features perform significantly worse over verbose queries compared to their performance over short queries. Moreover, those QPP methods that utilize passage-level information (i.e., Clarity(psg), WIG(psg), NQC(psg), PIQ variants and WPM2+PI) provide significantly better prediction. This demonstrates that, utilizing passage-level information for QPP becomes even more important in verbose query settings. Verbose queries are usually more informative than short queries; yet, existing document-level QPP methods are not well-designed to predict their quality. Verbose queries tend to express more focused information needs; hence, passage-level information may provide a better proxy of whether such needs may be satisfied by retrieved documents. See, e.g., Manish Gupta et al. "Information retrieval with verbose queries," Proceedings of the 38th International ACM SIGIR Conference on Research and Development in Information Retrieval (SIGIR '15), August 2015, p. 1121-1124 (hereinafter "Gupta"), the disclosure of which incorporated by reference herein, as well as the previously-cited Bendarsky reference.

Further notable is that, compared to the six first baseline methods, PIQ1 and PIQ2 provided significantly better prediction quality (with PIQ2 being slightly better); even exceeding in some of the cases that of WPM2—a very strong document-level QPP baseline. This serves as additional evidence that a hybrid document-level and passage-level prediction approach, e.g., that employed by the PIQ variants, is a better choice for verbose QPP settings. Moreover, such an approach guarantees a more robust QPP, which is less sensitive to query length. By further calibration, better prediction quality can be achieved. Indeed, the contribution of the passage-level calibration features to WPM2+PI is even more notable in the verbose query setting.

FIGS. 6A and 6B are tables showing experimental results which compare the passage-level derivation of p(r|D) discussed above with reference to Equation8 to several other alternative estimators. As discussed above, this term estimates the likelihood that a given result list as a whole contains any relevant information in general. p(r|D) is typically estimated according to the result list's cohesion or dispersion properties as discussed, for example, in Kurland. Both property types are basically the opposites of each other. Higher list cohesion may attest to a lower chance of query-drift, yet may result in lower (topic-)aspect coverage; whereas, higher list dispersion may attest to higher aspect coverage, but with more chance of query-drift.

A given result list D's cohesion and dispersion properties may be estimated according to its diameter or the entropy of its induced centroid language model, as discussed in, e.g., Kurland and Carmel. List diameter can be calculated as:

$$\dim(D) \stackrel{def}{=} \frac{-1}{|D|(|D|-1)} \Sigma_{d_i, d_j \in D; i \neq j} - D_{KL}(\hat{p}^{[0]}(\cdot \mid d_i) \| \hat{p}^{[0]}(\cdot \mid d_j)).$$

Lower/higher list diameter or entropy would attest to higher list cohesion/dispersion. All in all, the experimental setup implemented four alternative estimators, namely d-cohesion and d-dispersion for diameter-based estimation; and e-cohesion and e-dispersion for entropy-based estimation. The dispersion estimators are basically estimated in inverse relationship to the cohesion estimators.

The experimental setup also implemented two direct alternatives to Equation8 by using the average and standard deviation of the passage-level estimates instead of the maximum value. This results in three alternative estimators, denoted here as list-PI[max], list-PI[avg], and list-PI[std]. Note that list-PI[max] corresponds to MaxPsg as discussed above with reference to Equation8. Implementing list-PI [avg] and list-PI[std] entailed, respectively, considering the top-10 and top-100 passages $g \in D$ with the highest $s_q(g)$.

FIG. 6A is a table showing a comparison of various alternative p(r|D) estimators over short queries, while FIG. 6B is a table showing a comparison of various alternative p(r|D) estimators over verbose queries. In both FIGS. 6A and 6B, the superscript * denotes a statistically significant difference between a given list-PI variant and any of the four options based on dispersion and/or cohesion.

As an initial observation, the prediction quality results of the cohesion and dispersion estimators all agree (more or less) with the results previously reported, e.g., in Kurland. Next, for both short and verbose queries, these cohesion and dispersion estimators resulted in a significantly lower prediction quality than that of the list-PI variants. This provides yet another empirical evidence that passage-level information may better characterize the overall retrieval quality, even when it is being utilized on a list-level (rather than just on a document-level).

Also, among the three list-PI variants, list-PI[max] seems to be the dominant choice for short queries prediction; whereas, for verbose queries prediction, list-PI[std] is preferable. These results reveal some interesting observations. The quality of a result list retrieved for a short query may be better characterized by a single representative passage, and hence a MaxPsg approach may be useful. This is in comparison to the quality of a result list retrieved for a verbose query, which is usually more informative and therefore may require an evidence of relevance that is better characterized by more and diverse passage representatives.

As previously noted, the experimental results discussed thus far use a default window of L=500 characters and implement the Okapi-BM25 model as the underlying passage scorer. However, it may be useful to evaluate whether techniques implementing aspects of the present invention are sensitive to variations in the passage extraction (e.g., the size of window L) and/or scoring process (e.g., the model used to calculate $s_q(g)$).

Figure 7A:
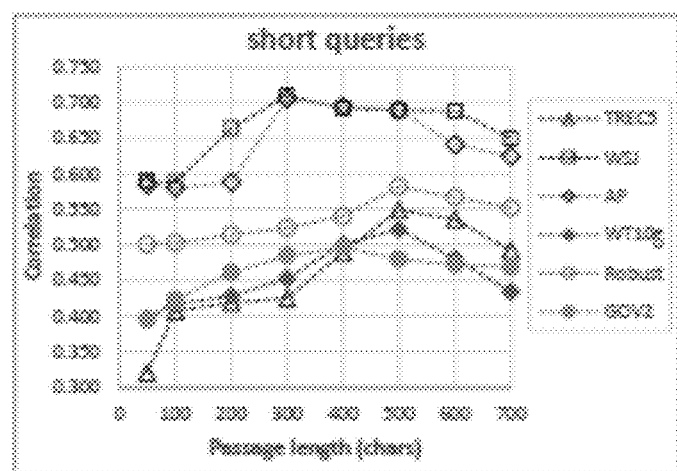
FIG. 7A is a line graph of experimental results for short queries which illustrate the sensitivity of PIQ2 to variations in package extraction window size according to an embodiment of the present invention.
Figure 7B:
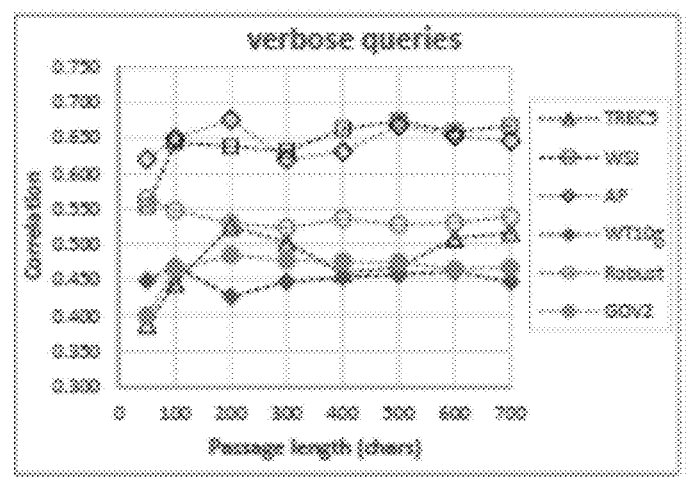
FIG. 7B is a line graph of experimental results for verbose queries which illustrate the sensitivity of PIQ2 to variations in package extraction window size according to an embodiment of the present invention.

FIGS. 7A and 7B are line graphs of experimental results which illustrate the sensitivity of PIQ2 to variations in the package extraction window size: FIG. 7A shows experimental results for short queries, while FIG. 7B shows experimental results for long queries. Each of these figures plots the correlation values for each of the aforementioned corpora (e.g., triangles for TREC5, hollow squares for WSJ, hollow diamonds for AP, solid diamonds for WT10g, hollow circles for Robust, and solid circles for GOV2) change relative to passage length, which is governed by the number of characters in extraction window L.

A comparison of FIG. 7A to 7B suggests that the "optimal" window size used for passage extraction varies between the two task types (i.e., short vs. verbose queries). On average, the best prediction performance over short queries is obtained for a window size of L=417(±98) characters; whereas, for verbose queries, the best prediction performance is obtained for a significantly smaller window size of L=208(±64) characters. Similar analysis results were obtained for the other five passage-level alternatives discussed herein (e.g., Clarity(psg), WIG(psg), NGC(psg), and PIQ1). These experimental results suggest that relevance estimation of short queries requires much larger passages than verbose queries, which implies that the ambiguity associated with shorter queries may be compensated by using more statistically robust (passage-level) evidence. This is in comparison to verbose queries, which are more informative, and whose relevance estimation may be more accurate when utilizing shorter and more focused (passage) evidence.

FIG. 8 is a table showing experimental results comparing prediction quality for passage-level QPP alternatives over verbose queries when using short passages (200 character) vs. long passages (400 characters). The superscript * denotes a statistically significant difference between a given PIQ variant and any of the three pure passage-level alternatives (e.g., Clarity(psg), WIG(psg), or NGC(psg)). As an initial observation, there is a trend in the majority of cases, where most methods improve their prediction quality when being used with shorter passages. That said, the PIQ variants (PIQ1 and PIQ2), which integrate passage-level information with document-level information, consistently dominate (in the majority of cases) over the three pure passage-level alternatives.

FIG. 9 is a table showing experimental results comparing prediction quality for passage-level QPP alternatives over verbose queries when using different passage scoring models. As with FIG. 8, the superscript * denotes a statistically significant difference between a given PIQ variant and any of the three pure passage-level alternatives (e.g., Clarity (psg), WIG(psg), or NGC(psg)). FIG. 9 analyzes the sensitive of the various passage-level QPP alternatives when being applied to the verbose QPP task using three different passage scoring models (i.e., instantiations of $s_q(g)$). As previously noted, the default scoring is BM25 as described in, e.g., Tellex and Géry. FIG. 9 includes another scoring model described by Tellex: TF-IDF. FIG. 9 further includes PDQ which can be calculated as the (document-smoothed) language model score:

$$s_q(g) \stackrel{def}{=} \frac{\alpha \hat{p}^{[\mu]}(q \mid g)}{\Sigma_{g' \in d \in D} \hat{p}^{[\mu]}(q \mid g')} + \frac{(1-\alpha)\hat{p}^{[\mu]}(q \mid dg)}{\Sigma_{d' \in D} \hat{p}^{[\mu]}(q \mid d')}$$

with $\mu=2000$ and $\alpha=0.9$. See, e.g., James P. Callan, Passage-level evidence in document retrieval, Proceedings of the 17th Annual International ACM SIGIR Conference on Research and Development in Information Retrieval (SIGIR '94), August 1994, p. 302-310 (hereinafter "Callan"), the disclosure of which is incorporated by reference herein, in addition to the previously-cited Krikon reference.

Overall, in the majority of benchmarks, using passages scored (and ranked) by the BM25 model has resulted in a better prediction quality for most passage-level QPP alternatives. Moreover, the PIQ variants exhibit clear performance dominance over the three other alternatives (with more favorable results obtained by PIQ2), independently of the passage scoring model. Passage-level information is a very important QPP signal, especially when used together with document-level information, thereby producing more robust prediction which is less sensitive to query length.

One or more embodiments of the invention, or elements thereof, can be implemented, at least in part, in the form of an apparatus including a memory and at least one processor that is coupled to the memory and operative to perform exemplary method steps.

Figure 10:
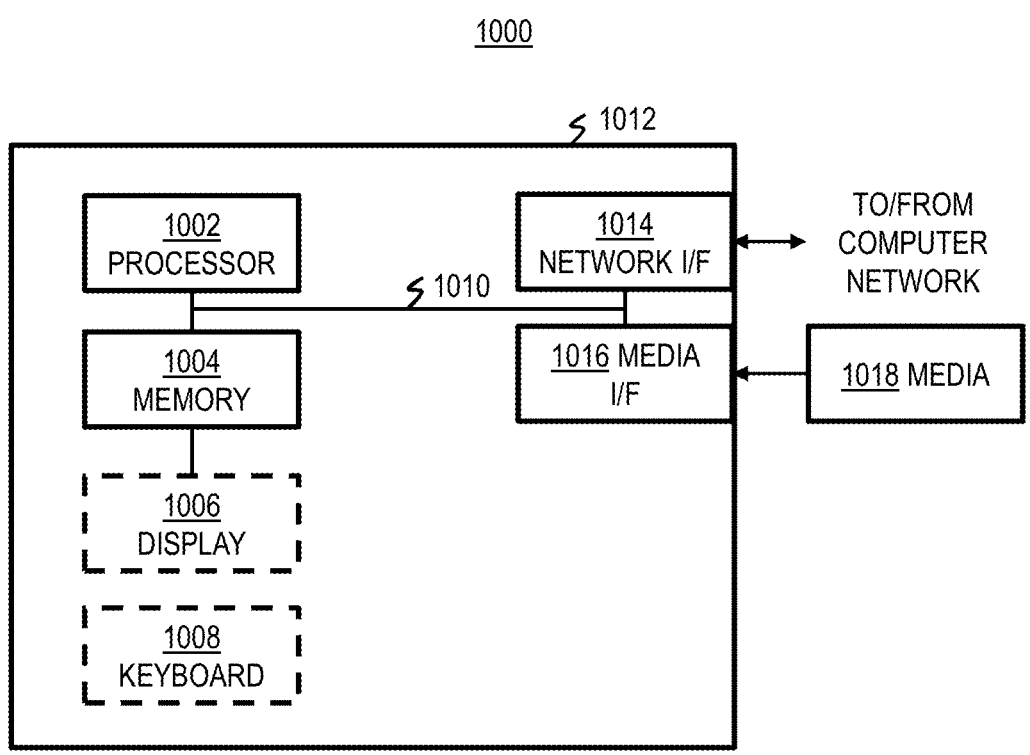
FIG. 10 shows a computer system that may be useful in implementing one or more aspects and/or elements of the invention.

One or more embodiments can make use of software running on a general purpose computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 1002. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for post-retrieval query performance prediction using hybrid document-passage information, the method comprising:
    obtaining a set of documents of a corpus of documents;
    extracting document-level information regarding respective documents within the set;
    extracting passage-level information regarding respective passages of a proper subset of documents within the document corpus, based on a probability of the proper subset of documents including relevant information independent of a specific query; and
    estimating a likelihood that the proper subset of documents within the document corpus includes relevant information to the specific query by using the passage-level information for the proper subset of documents of the document corpus, the proper subset of documents retrieved using the document-level information, the proper subset of documents being the top-k documents relative to the specific query.

2. A method for post-retrieval query performance prediction using hybrid document-passage information, the method comprising:
    with a computerized information retrieval system, obtaining a set of documents responsive to a specific query;
    with the computerized information retrieval system, extracting document-level information regarding respective documents within the set;
    with the computerized information retrieval system, extracting passage-level information regarding respective passages of documents within the set;
    with the computerized information retrieval system, estimating a likelihood that the set of documents includes relevant information to the specific query using both the document-level information and the passage-level information;
    with the computerized information retrieval system, estimating one or more score calibration signals using the passage-level information; and
    with the computerized information retrieval system, estimating the likelihood that the set of documents includes relevant information to the specific query based at least in part on the one or more score-calibration signals estimated using the passage-level information.

3. The method of claim 2, further comprising:
    generating a WPM2 weighted product model using the document-level information; and estimating the likelihood that the set of documents includes relevant information to the specific query based on the WPM2 weighted product model using the document-level information and the one or more score-calibration signals using the passage-level information.

4. The method of claim 2, wherein a first of the score-calibration signals estimated using the passage-level information denotes a likelihood, estimated using a representative passage for a given document, that the given document within the set includes relevant information regardless of the specific query.

5. The method of claim 4, wherein the representative passage for the given document is a single passage within the given document having a highest retrieval score for the specific query.

6. The method of claim 4, wherein the representative passage is extracted from the given document using a first window size when the specific query has a first length, and wherein the representative passage is extracted from the given document using a second window size when the specific query has a second length, the first query length being less than the second length, and the first window size being greater than the second window size.

7. The method of claim 4, wherein estimating the likelihood that the given document within the set includes relevant information regardless of the specific query comprises:
  estimating a likelihood that the representative passage includes the relevant information; and
  estimating a relationship between the representative passage and the given document.

8. The method of claim 7, wherein the likelihood that the representative passage includes the relevant information is estimated as a combination of:
  a language model entropy of the representative passage; and
  a position of the representative passage within the given document.

9. The method of claim 7, wherein the likelihood that the representative passage includes the relevant information is estimated so as to prefer that the representative passage be more diverse and be located earlier within the given document.

10. The method of claim 4, wherein the likelihood that a set of documents includes relevant information to a specific query is estimated further based at least in part on a normalization term estimated based on a length of the specific query.

11. The method of claim 10, wherein estimating the likelihood that the set of documents includes relevant information to the specific query based at least in part on the estimated one or more score-calibration signals using passage-level information comprises calibrating respective weights assigned at least to the first score calibration signal and to the normalization term.

12. The method of claim 4, wherein a second of the score-calibration signals is estimated using the representative passage for the given document and captures a relationship between the given document and the set of documents.

13. The method of claim 12, wherein estimating the second score-calibration signal comprises:
  estimating a similarity of the representative passage to the given document; and
  estimating a similarity of the representative passage to a relevance model for the set of documents.

14. The method of claim 12, wherein a third of the score-calibration signals is estimated using at least one representative passage for the set of documents and denotes a likelihood that the set of documents includes relevant information regardless of the specific query.

15. The method of claim 14:
  wherein the representative passage for the given document is a single passage within the given document having a highest retrieval score for the specific query, and
  wherein the representative passage for the set of documents is a single passage within the set of documents having a highest retrieval score for the specific query.

16. The method of claim 14, wherein the third of the score-calibration signals is estimated using an average or a standard deviation for a set of passages within the set of documents selected using respective retrieval scores for the set of passages.

17. The method of claim 14, wherein estimating the likelihood that the set of documents within includes relevant information regardless of the specific query comprises:
  estimating a likelihood that the representative passage for the set of documents includes the relevant information; and
  estimating a similarity between the representative passage for the set of documents and a centroid language model for the set of documents.

18. The method of claim 14, wherein estimating the likelihood that the set of documents includes relevant information to the specific query based at least in part on the estimated one or more score-calibration signals using passage-level information comprises calibrating respective weights assigned at least to the first score calibration signal, the second score calibration signal, and the third score calibration signal.

19. An apparatus for post-retrieval query performance prediction using hybrid document-passage information, the apparatus comprising:
  a memory; and
  at least one processor coupled to the memory, the processor being operative:
    to obtain a set of documents responsive to a specific query;
    to extract document-level information regarding respective documents within the set;
    to extract passage-level information regarding respective passages of documents within the set;
    to estimate a likelihood that the set of documents includes relevant information to the specific query using both the document-level information and the passage-level information;
    to estimate one or more score calibration signals using the passage-level information; and
    to estimate the likelihood that the set of documents includes relevant information to the specific query based at least in part on the one or more score-calibration signals estimated using the passage-level information.

20. A computer program product comprising a non-transitory machine-readable storage medium having machine-readable program code embodied therewith, said machine-readable program code comprising machine-readable program code configured:
  to obtain a set of documents responsive to a specific query;
  to extract document-level information regarding respective documents within the set;
  to extract passage-level information regarding respective passages of documents within the set;

to estimate a likelihood that the set of documents includes relevant information to the specific query using both the document-level information and the passage-level information;
to estimate one or more score calibration signals using the passage-level information; and
to estimate the likelihood that the set of documents includes relevant information to the specific query based at least in part on the one or more score-calibration signals estimated using the passage-level information.

\* \* \* \* \*